(12) United States Patent
Cohn et al.

(10) Patent No.: US 9,840,980 B2
(45) Date of Patent: Dec. 12, 2017

(54) GASOLINE PARTICULATE REDUCTION USING OPTIMIZED PORT AND DIRECT INJECTION

(71) Applicant: Ethanol Boosting Systems, LLC, Cambridge, MA (US)

(72) Inventors: Daniel R. Cohn, Cambridge, MA (US); Leslie Bromberg, Sharon, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

(21) Appl. No.: 15/208,120

(22) Filed: Jul. 12, 2016

(65) Prior Publication Data

US 2016/0319764 A1 Nov. 3, 2016

Related U.S. Application Data

(63) Continuation of application No. 14/840,688, filed on Aug. 31, 2015, now Pat. No. 9,441,570, which is a
(Continued)

(51) Int. Cl.
*F02D 41/06* (2006.01)
*F02D 41/30* (2006.01)
(Continued)

(52) U.S. Cl.
CPC ..... *F02D 41/3094* (2013.01); *F02D 13/0215* (2013.01); *F02D 13/0242* (2013.01);
(Continued)

(58) Field of Classification Search
CPC ............ F02D 41/3094; F02D 41/0002; F02D 41/047; F02D 41/3023; F02D 41/064;
(Continued)

(56) References Cited

U.S. PATENT DOCUMENTS 5,927,238 A 7/1999 Watson
6,305,169 B1 * 10/2001 Mallof ............... F01D 15/10
60/608

(Continued)

FOREIGN PATENT DOCUMENTS

CN 101228342 A 7/2008
CN 102345532 A 2/2012
(Continued)

OTHER PUBLICATIONS

International Search Report and Written Opinion dated Apr. 16, 2014 in co-pending PCT application No. PCT/US2013/073334.
(Continued)

*Primary Examiner* — Hai Huynh
(74) *Attorney, Agent, or Firm* — Nields, Lemack & Frame, LLC

(57) ABSTRACT

Additional approaches for the reduction of particulate emissions in gasoline engines using optimized port+direct injection are described. These embodiments include control of the amount of directly injected fuel so as to avoid a threshold increase in particulates due to piston wetting and reduction of cold start emissions by use of air preheating using variable valve timing.

27 Claims, 13 Drawing Sheets

Related U.S. Application Data continuation-in-part of application No. 14/391,906, filed as application No. PCT/US2013/073334 on Dec. 5, 2013, now Pat. No. 9,435,288.

(60) Provisional application No. 61/734,438, filed on Dec. 7, 2012, provisional application No. 62/044,761, filed on Sep. 2, 2014, provisional application No. 62/128,162, filed on Mar. 4, 2015, provisional application No. 62/079,885, filed on Nov. 14, 2014.

(51) Int. Cl.

| | | |
|---|---|---|
| *F02D 13/02* | (2006.01) | |
| *F02D 35/02* | (2006.01) | |
| *F02D 37/02* | (2006.01) | |
| *F02D 41/00* | (2006.01) | |
| *F02D 41/04* | (2006.01) | |
| *F02M 69/04* | (2006.01) | |
| *F02P 5/145* | (2006.01) | |
| *F02P 5/152* | (2006.01) | |
| *F02P 5/15* | (2006.01) | |

(52) U.S. Cl.
CPC ........... *F02D 35/027* (2013.01); *F02D 37/02* (2013.01); *F02D 41/0002* (2013.01); *F02D 41/047* (2013.01); *F02D 41/064* (2013.01); *F02D 41/3023* (2013.01); *F02M 69/046* (2013.01); *F02P 5/145* (2013.01); *F02P 5/152* (2013.01); *F02P 5/1506* (2013.01); F02D 2013/0292 (2013.01); F02D 2041/001 (2013.01); F02D 2250/38 (2013.01); Y02T 10/18 (2013.01); Y02T 10/46 (2013.01)

(58) Field of Classification Search
CPC ............. F02D 13/0215; F02D 13/0242; F02D 35/027; F02D 37/02; F02D 2013/0292; F02D 2041/001; F02D 2250/38; F02P 5/152; F02P 5/1506; F02P 5/145; F02M 69/046; Y02T 10/18; Y02T 10/46
USPC ... 123/299, 300, 305, 27 GE, 525, 431, 575, 123/576, 577, 672, 681, 685, 556, 58.8, 123/198 A, 491, 406.21, 406.23, 406.29, 123/406.47, 406.48, 90.15; 701/110, 113
See application file for complete search history.

(56) References Cited

U.S. PATENT DOCUMENTS

| | | | |
|---|---|---|---|
| 6,453,664 B2 | 9/2002 | Ishii et al. | |
| 6,637,386 B2 | 10/2003 | Murata et al. | |
| 6,805,095 B2 | 10/2004 | Sun et al. | |
| 7,225,787 B2 | 6/2007 | Bromberg et al. | |
| 7,303,144 B2 | 12/2007 | Alyanak | |
| 7,370,610 B2 | 5/2008 | Ashford et al. | |
| 7,546,834 B1 | 6/2009 | Ulrey et al. | |
| 7,640,914 B2 | 1/2010 | Lewis et al. | |
| 7,647,916 B2 | 1/2010 | Leone et al. | |
| 7,690,341 B2 | 4/2010 | Abe et al. | |
| 7,765,053 B2* | 7/2010 | Gwidt | F02D 41/0245 123/299 |
| 7,770,560 B2 | 8/2010 | Ulrey et al. | |
| 7,933,713 B2 | 4/2011 | Leone | |
| 7,957,888 B2 | 6/2011 | Leone et al. | |
| 8,037,850 B2 | 10/2011 | Pursifull | |
| 8,099,949 B2* | 1/2012 | Leone | F02D 19/081 60/274 |
| 8,100,107 B2 | 1/2012 | Bidner et al. | |
| 8,146,568 B2 | 4/2012 | Cohn et al. | |
| 8,206,470 B1 | 6/2012 | Jacobson | |
| 8,267,074 B2 | 9/2012 | Leone et al. | |
| 8,275,538 B2 | 9/2012 | Surnilla et al. | |
| 8,353,269 B2 | 1/2013 | Kasseris et al. | |
| 8,397,701 B2* | 3/2013 | Lewis | F02D 19/084 123/1 A |
| 8,459,007 B2 | 6/2013 | Maier et al. | |
| 8,578,913 B2 | 11/2013 | Yoshioka et al. | |
| 8,875,680 B2 | 11/2014 | Yoshioka | |
| 8,944,026 B2 | 2/2015 | Tobergte et al. | |
| 9,382,857 B2* | 7/2016 | Glugla | F02D 41/025 |
| 9,435,288 B2 | 9/2016 | Cohn et al. | |
| 9,441,570 B2 | 9/2016 | Cohn et al. | |
| 9,512,798 B2 | 12/2016 | Zeng et al. | |
| 9,556,784 B2* | 1/2017 | Leone | F02B 17/005 |
| 9,631,573 B2* | 4/2017 | Surnilla | F02D 41/1454 |
| 9,739,213 B2 | 8/2017 | Kemmerling et al. | |
| 2004/0163379 A1* | 8/2004 | Pott | F02D 37/02 60/284 |
| 2006/0180121 A1 | 8/2006 | Wickman et al. | |
| 2007/0089697 A1 | 4/2007 | Hara et al. | |
| 2008/0022958 A1 | 1/2008 | I et al. | |
| 2009/0282810 A1 | 11/2009 | Leone et al. | |
| 2010/0251996 A1 | 10/2010 | Akimoto | |
| 2011/0023467 A1 | 2/2011 | Kong et al. | |
| 2011/0162620 A1 | 7/2011 | Bidner et al. | |
| 2011/0203258 A1 | 8/2011 | Makartchouk et al. | |
| 2012/0024262 A1 | 2/2012 | Leone | |
| 2012/0102925 A1 | 5/2012 | Leone et al. | |
| 2012/0107203 A1 | 5/2012 | Arnold et al. | |
| 2014/0172275 A1 | 6/2014 | Surnilla et al. | |
| 2014/0297162 A1 | 10/2014 | Surnilla et al. | |
| 2015/0240737 A1 | 8/2015 | Surnilla et al. | |
| 2015/0285179 A1 | 10/2015 | Cohn et al. | |
| 2015/0369162 A1 | 12/2015 | Cohn et al. | |
| 2016/0115884 A1 | 4/2016 | Vanderwege et al. | |
| 2016/0326971 A1 | 11/2016 | Cohn et al. | |
| 2016/0356228 A1* | 12/2016 | Liu | F02D 41/064 |

FOREIGN PATENT DOCUMENTS

| | | | |
|---|---|---|---|
| CN | 102400802 A | 4/2012 | |
| JP | 2006-250058 A | 9/2006 | |
| JP | 2009299538 | * 12/2009 | ............. F02D 45/00 |
| JP | 2010-255507 A | 11/2010 | |
| WO | 2012/021990 A1 | 2/2012 | |
| WO | 2014/089304 A1 | 6/2014 | |

OTHER PUBLICATIONS

International Search Report and Written Opinion dated Dec. 4, 2015 in corresponding PCT application No. PCT/US2015/047857.

Ketterer, "Soot Formation in Direct Injection Spark Ignition Engines Under Cold-Idle Operating Conditions," Department of Mechanical Engineering, Massachusetts Institute of Technology, Sep. 2013.

Chinese communication, with English translation, dated Feb. 4, 2017 in co-pending Chinese patent application No. 201380072556.5.

Office action dated May 24, 2017 in co-pending U.S. Appl. No. 15/214,533.

Office action dated Aug. 31, 2017 in co-pending U.S. Appl. No. 15/214,533.

Office action dated Sep. 22, 2017 in co-pending U.S. Appl. No. 15/214,533.

\* cited by examiner

GASOLINE PARTICULATE REDUCTION USING OPTIMIZED PORT AND DIRECT INJECTION

This application is a continuation of U.S. patent application Ser. No. 14/840,688 filed Aug. 31, 2015, which is a continuation-in part of U.S. patent application Ser. No. 14/391,906 filed Oct. 10, 2014, which is a National Stage entry of PCT/US13/73334, filed Dec. 5, 2013, which claims priority of U.S. Patent Application Ser. No. 61/734,438 filed Dec. 7, 2012, the disclosures of which are incorporated herein by reference in their entireties. U.S. patent application Ser. No. 14/840,688 also claims priority of U.S. Provisional Patent Application Ser. No. 62/044,761, filed Sep. 2, 2014, U.S. Provisional Patent Application Ser. No. 62/128,162, filed Mar. 4, 2015 and U.S. Provisional Patent Application Ser. No. 62/079,885 filed Nov. 14, 2014, the disclosures of which are incorporated herein by reference in their entireties.

BACKGROUND

There is increasing concern about particulate matter (PM) emissions from gasoline engine vehicles. The concern is driven by the substantially higher emissions of small particulates from spark ignited gasoline powered vehicles that use direct injection (DI) of gasoline into at least one of the engine cylinders as a liquid. These small particulates lodge in the lungs and can be injurious to human health.

Although direct injection increases engine efficiency and performance by increasing knock resistance though evaporative cooling, use of DI throughout a drive cycle substantially increases the particulate emissions. Relative to conventional port fuel injected (PFI) engines, the particle number when operating with direct injection increases by factors of 10-100 over a drive cycle, depending on the cycle and the engine operating conditions. The emissions are especially concerning for engines that are turbocharged and this would also be the case for supercharged engines.

More stringent regulations on PM 2.5 (particulate matter less than 2.5 microns in diameter) are planned for Europe and anticipated in the US, including both EPA and California regulations. The European regulations would apply to the number of particulates as well as to the amount of particulate mass that is emitted.

Therefore, techniques that improve engine performance while minimizing particulate emissions would be beneficial.

SUMMARY OF INVENTION

Additional approaches for the reduction of particulate emissions in gasoline engines are described. These embodiments include control of the amount of directly injected fuel so as to avoid a threshold increase in particulates due to piston wetting and reduction of cold start emissions by use of air preheating using variable valve timing.

BRIEF DESCRIPTION OF THE DRAWINGS

For a better understanding of the present disclosure, reference is made to the accompanying drawings, which are incorporated herein by reference and in which.

DETAILED DESCRIPTION

Figure 1:
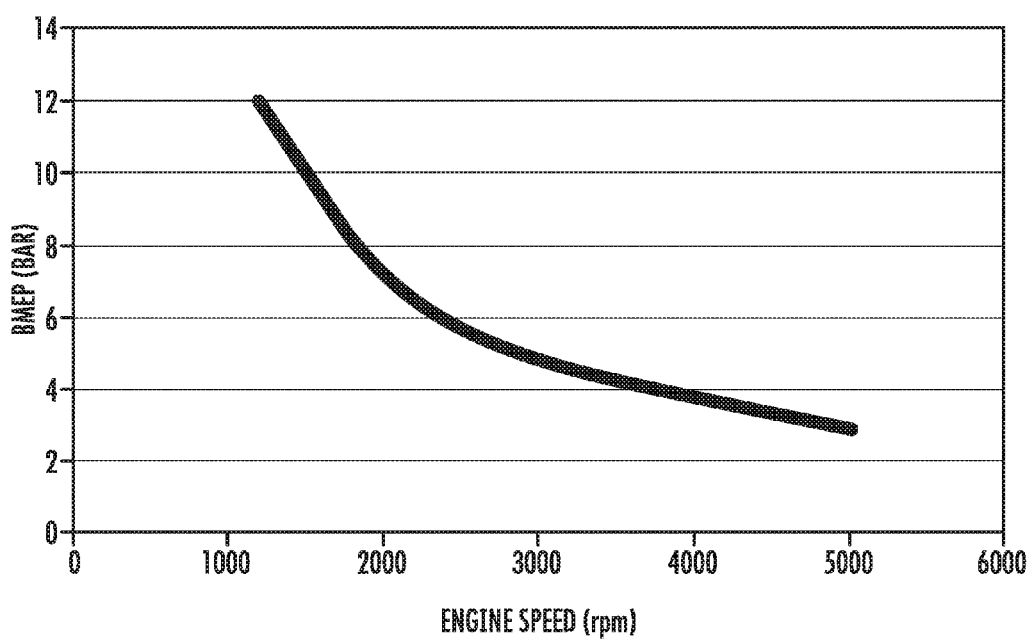
FIG. 1 is an illustrative model prediction of threshold BMEP (brake mean effective pressure) for preventing direct injection generation of particulates for warmed up engine conditions. Operation below the line prevents particulates, operation above the line generates particulates. Brake mean effective pressure corresponds to torque for a given volume of the engine cylinders.

As discussed in co-pending patent application WO2014/089304, improved approaches to control particulate emissions from spark ignited gasoline engines have been developed. These approaches involve optimized use of port fuel injection in combination with direct injection where the good mixing provided by port fuel injection (PFI) produces much less particulate emissions than direct injection. In these approaches, the fuel management system minimizes the amount of direct injection by optimal use of port injection while maximizing engine performance and efficiency through the use of direct injection.

A basic approach that is used is increasing the fraction of fuel that is introduced into the engine cylinders by direct injection so that it is substantially equal to the amount needed to suppress knock as the engine operating condition (torque, speed) changes. Continual matching of fraction of fuel that is directly injected to that needed to prevent knock throughout all the torque range, or if not all, the high end of the torque range where direct injection is needed to prevent knock, minimizes the amount of directly injected fuel. When more knock resistance is called for, the direct injection fraction is increased and when less knock resistance is needed, the direct injection fraction is reduced. The matching can follow the ups and down of higher torque operation throughout the engine drive cycle. When direct injection is not needed for knock control it can be set to zero. Closed loop control using a knock detector together with open loop control using a look up table that relates engine parameters to required knock resistance can provide a highly responsive means of matching the fraction of fuel that is directly injected so as to provide required knock resistance as the torque changes.

The fuel management control system can be employed to operate the engine with only port fuel injection or with both port and direct injection or with direct injection alone depending on engine conditions and on engine performance requirements.

In addition, the fuel management system can also further reduce particulate emissions by making adjustments that reduce the fraction of fuel that is directly injected during those portions of the drive cycle when particulate emissions are especially high. These portions of the drive cycle include cold start and certain portions of the warmed-up engine part of the drive cycle. During these portions of the drive cycle, adjustments are made so that the fraction of fuel that is directly injected is lower than it would otherwise be to avoid knock. The adjustments include increasing spark retard and variable valve timing. They also can include open-valve port fuel injection where open-valve port fuel injection is used to provide vaporization cooling instead of direct injection.

Measurements of particulate emissions have shown that they are very high during a cold start period of the first 100 seconds or so after the engine has been started. Minimizing the fraction of fuel that is directly injected as torque increases and making adjustments, such as increasing spark retard, can be especially important throughout the entire torque and speed range during this cold start portion of the drive cycle. Variable valve timing and/or open-valve port fuel injection could also be used in this cold start period of the drive cycle.

Measurements of particulate emissions during warmed up engine operation (which occurs after the engine has been operated for around 100 seconds or so) indicate that particulate emissions are also especially high at high levels of torque and speed. Optimized use of the fuel management system during the high torque and high speed portion of the warmed up cycle can require a different control approach than that used in cold start and certain other transient conditions.

This disclosure describes additional approaches for particulate reduction in both cold and warmed up engine operation.

In order to provide a basis for the control system during the warmed up engine portion of the drive cycle, a model for particulate emissions based on piston wetting has been developed. This model is then used to provide additional fuel management control to further reduce particulate emissions. Although this model has been developed for warmed up operation, it may also provide some degree of applicability for cold start operation.

Other means for further optimizing the combined use of port and direct injection for gasoline engine particulate reduction are also described. They include control system operation optimized for stratified direct injection. Stratified direct injection can provide increased efficiency through dilute and open throttle operation at low torque but also increases particulate emissions The combination of these approaches can make it possible for drive cycle particulate emissions from a gasoline engine with optimized direct+port fuel injection to be reduced to at least less than 1.2 times the drive cycle particulate emissions for a comparable PFI only fueled engine and to preferably be less than 1.1 times that of a comparable PFI only engine.

This could make it possible for environmental regulations to be met without the cost, durability and efficiency reduction concerns of adding a gasoline particulate filter (GPF) exhaust aftertreatment system. Alternatively, this technology could be used in combination with GPF exhaust treatment to substantially reduce the cost, reliability, durability and efficiency drawbacks of gasoline particulate filters. Further, this technology, in combination with GPF treatment, could provide greater particulate reduction than the use of a GPF system alone.

In this disclosure, additional aspects of the use of engine air heating enabled by variable valve timing as a means to reduce particulate emissions from port fuel injection are also covered.

Wall Wetting Model for Particulate Matter Production

A simple heuristic model for particulate matter (PM) production from wall wetting has been developed. This model provides a means to assess the particulate suppression impacts from changes in the combination of port and direct injection during various times in the drive cycle.

It is believed that the increase in particulate emissions from DI fueling is mainly due to liner or piston wetting, when fuel droplets hit the surfaces and make a liquid film. There are means of avoiding the spray from wetting the piston and/or the liner. Smaller aerosols, with lower inertia-to-drag (thus, more attached to the air flow and less likely to be separated by acceleration), can be used. The increase in pressure required for atomizing the droplets can result in increased penetration of the spray, but the reduced tendency of the smaller droplets to separate from the flow results in a lower wetting fraction of the fuel. The timing of injection can also be adjusted. There is a tradeoff between improved mixing early in the intake stroke and decreased distance between the piston and the injector tip.

This heuristic model assumes that PM is generated as a result of wall wetting, and that it is proportional to the amount of fuel on the piston (in other words, liner wetting is not assumed).

The amount of fuel that wets the piston depends on the amount of fuel injected during that time when wall wetting is likely. It takes time for the spray to penetrate to the location of the piston, changing the overall flow pattern in the cylinder. Hence, for short injection on-times, the spray pattern does not make it to the piston and there is no wall wetting. With longer injections, which is a consequence of longer injection times at higher loads, the gas pattern changes (modified by the spray) and there is piston wetting. At that point, the rate of fuel that hits the piston is constant. Thus in this model, the amount of fuel on the piston follows a displaced-linear relationship of the total amount of fuel injected: there is a threshold torque, also known as "load" or brake mean effective pressure (BMEP) below which it is possible to inject all the needed fuel without fuel impingement, followed by a linear growth until the highest torque (BMEP) is reached.

There is a limiting crank angle during the intake that avoids impingement. Beyond that crank angle during the intake, there is no impingement. Similarly, there is a crank angle during compression where impingement begins. There is no impingement before that crank angle during the compression, and there is impingement after it. If injection occurs between the two limits, there is no impingement and very little or no soot formation.

FIG. 1 shows a model calculation for the maximum BMEP (brake mean effective pressure) that results in avoidance of fuel impingement (which corresponds to injection time between the two crank-angles in the intake and compression strokes described above), for an illustrative set of directly injected engine parameters and fuel injection rates (assumed to be constant). The BMEP threshold increases with decreasing engine speed, as there is more time for injection that avoids fuel impingement. For a given size engine, BMEP correspond to torque.

The model assumes that there is a sufficiently short on-time for injection (in crank angle degrees) that prevents wall wetting altogether. Since DI has approximately constant rate of fuel injection (determined by the fuel pressure and the injector characteristics), requiring less fuel results in decreased injector on-time. In direct injection (as in the case of port-fuel injection), the amount of fuel injected is controlled by adjusting the injector on-time (using PWM, or Pulse Width Modulation). The start of injection is a compromise between good mixture preparation and preventing wall wetting (either cylinder lining or piston).

PM generation has been measured as a function of injection timing (SOI-start of injection). The spray wets the piston/liner either with very early injection in the intake stroke, or late injection during the compression stroke. To minimize particulate generation, injection should not occur earlier than what results in piston wetting during the intake stroke or later than what results in piston wetting during the compression stroke. There is a window of piston location where direct injection does not result in piston wetting. Under these conditions, with light load and low engine speeds, there can be a wide range of SOI that results in minimal particulate matter.

Particulates are mostly produced during transients (acceleration) and at high load (and in cold start).

The particulate production is directly related to the amount of impingement. Thus, at a constant engine speed, there is a torque and a corresponding amount of direct injection below which there is no PM generation, and PM generation increases linearly after this. Consequently, reducing the amount of directly injected fuel causes the particulate emissions to drop linearly and below a certain value to drop very dramatically. This feature indicates that, by minimizing the amount of direct injection by increasing it to substantially only to the fraction of fueling needed to prevent knock as torque is increased, there can be a large impact in reducing particulate emissions.

Figure 2:
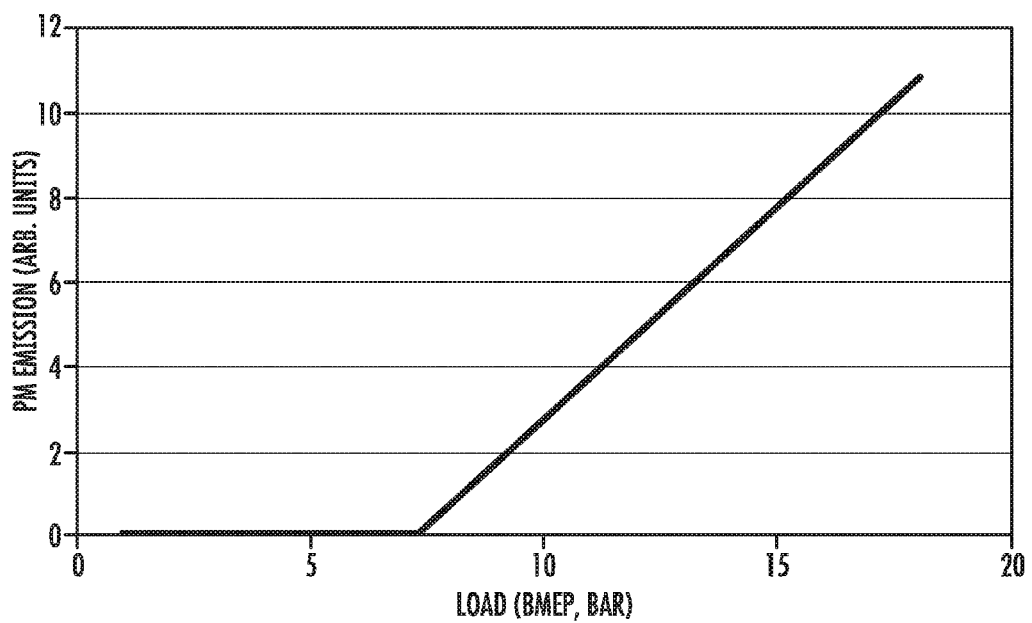
FIG. 2 shows illustrative model calculations for particulate emissions as function of BMEP at 2000 rpm.

FIG. 2 shows a calculation for particulate production for the same engine parameters as in FIG. 1, operating at 2000 rpm, with all the fuel introduced through the direct injector, as a function of load. The threshold BMEP for production of particulates is about 7 bar BMEP. Above that, the particulate production is linear with injection until the end of injection, and thus is a linear function of BMEP in excess of the threshold BMEP.

Figure 3:
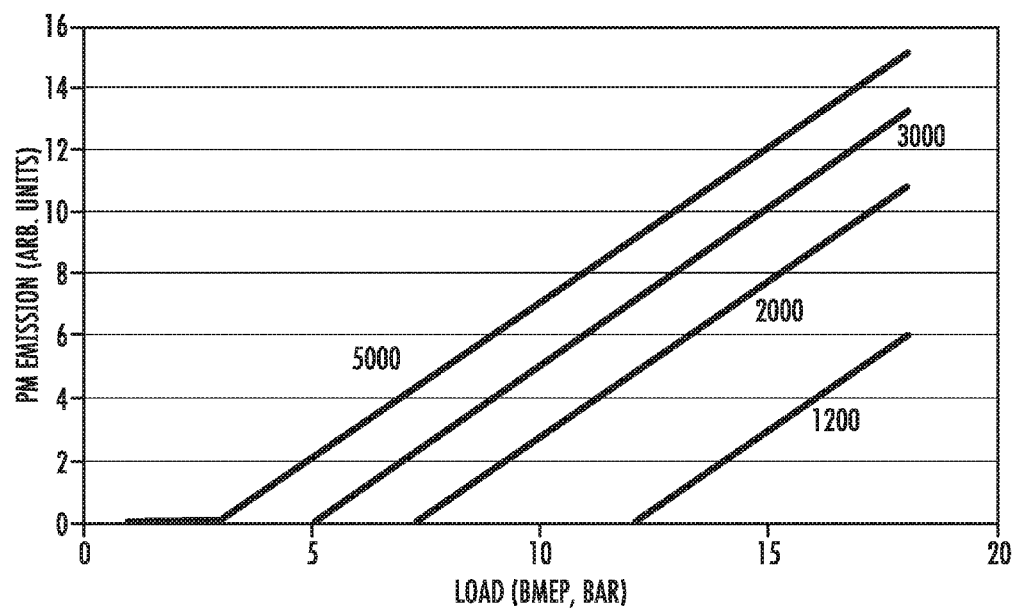
FIG. 3 shows illustrative model calculations for particulate matter generation in arbitrary units as a function of brake-mean effective pressure (BMEP), for several engine speeds.

FIG. 3 shows the particulate matter generated using the heuristic model for several engine speeds. For gasoline DI engines, there is evidence of a correlation between the particulate number density and the mass, as a result of a relatively consistent size distribution of the particulate matter (particle mass is roughly proportional to number concentration). Thus, for assessment of the general implications of this model, it is assumed that FIG. 3 is applicable to either mass or number density.

The results of the model for direct injection generated particulate concentration in the engine exhaust are shown in FIG. 3. At the higher engine speeds and loads, the total mass and number of particulate emission increases as the total fuel per injection increases and the time allowed for non-wetting injection decreases. According to the model, for a given engine speed, the change in particulate matter generation with increasing BMEP is 0 up to a given BMEP and then increases linearly with increasing BMEP. Since, for a given size engine, BMEP corresponds to torque, FIG. 3 is also a plot of particulate emissions as a function of torque and speed.

The BMEP at which the onset of this change occurs corresponds to a given amount of fuel that is directly injected into the engine. Thus, the model indicates a flat dependence of particulate emissions with increasing amount of fuel up to a given amount of directly injected fuel followed by the onset of a linear rise of particulates with an increasing amount of directly injected fuel. Because the model is an approximation, a useful more general description of this dependence of particulate matter on the amount of directly injected fuel is that above a threshold level of the amount of directly injected fuel, the particulate emissions undergo a large percentage increase relative to the zero or near level below the threshold level. This is referred to as a "threshold increase".

Figure 4:
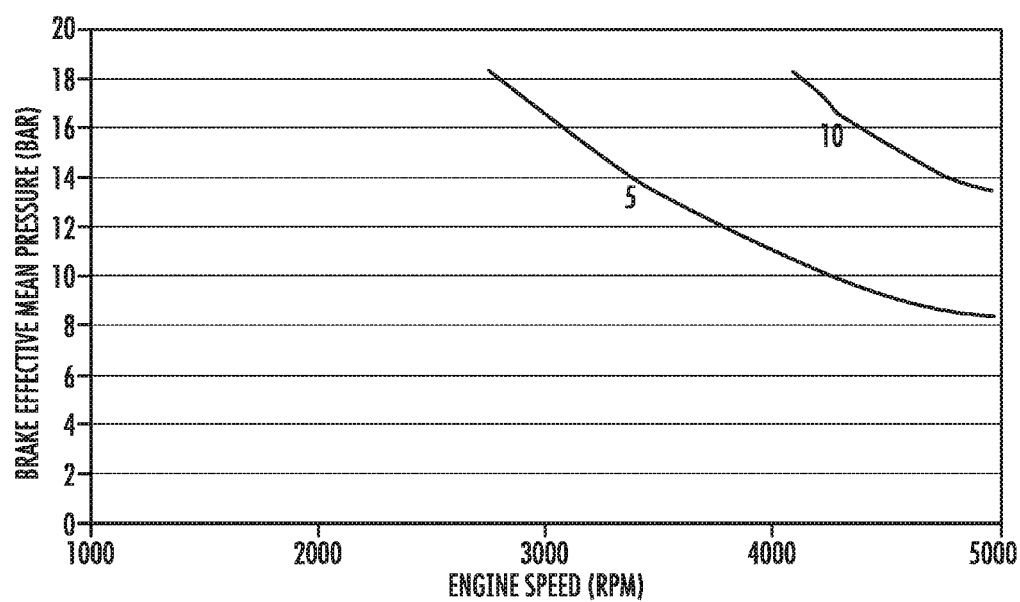
FIG. 4 shows particulate generation (arbitrary units) over the engine operating map. Contours are shown for arbitrary units of 5 and 10.

FIG. 4 shows the particulate emission, with this model, over the engine map. The PM generation is in arbitrary units. With this information, different means of minimizing particulate emission may be compared by comparing the engine maps, and then using the engine maps to project implications of use of the approach over a driving cycle.

Spray entrainment in the gas could modify the above model. During direct injection, the spray is entrained in the gas flow, which prevents impingement on the piston. As injection continues, the gas flow is modified by interaction with the spray, and the spray gets to the piston. As in the previous model, there is a time during which there is no wall impingement. Afterwards, the spray impingement in the piston increases linearly with load (and thus, injected fuel and injection time). As the ratio between the fuel injected and the density of air in the cylinder are constant, the amount of fuel that impinges on the piston is constant relatively independent on load. Thus, it is not expected that flow entrainment issues would substantially modify the above model.

Combined Use of PFI and DI

The main benefit of using direct injection is generally to increase knock resistance by vaporization cooling. This is particularly important in turbocharged or supercharged engines. Use of port fuel injection makes it possible to use direct injection only in an amount needed to prevent knock. Optimized control of the combination of port and direct injection can minimize the amount of direct injection while providing the knock resistance where needed to maximize engine performance and efficiency. Both closed loop control using knock detection and other sensors and open loop control can be employed.

The model described above can be used to determine particulate emissions of combined PFI and DI operation that is employed to minimize their generation by matching the DI use to the amount needed to is the amount to prevent knock.

Figure 5:
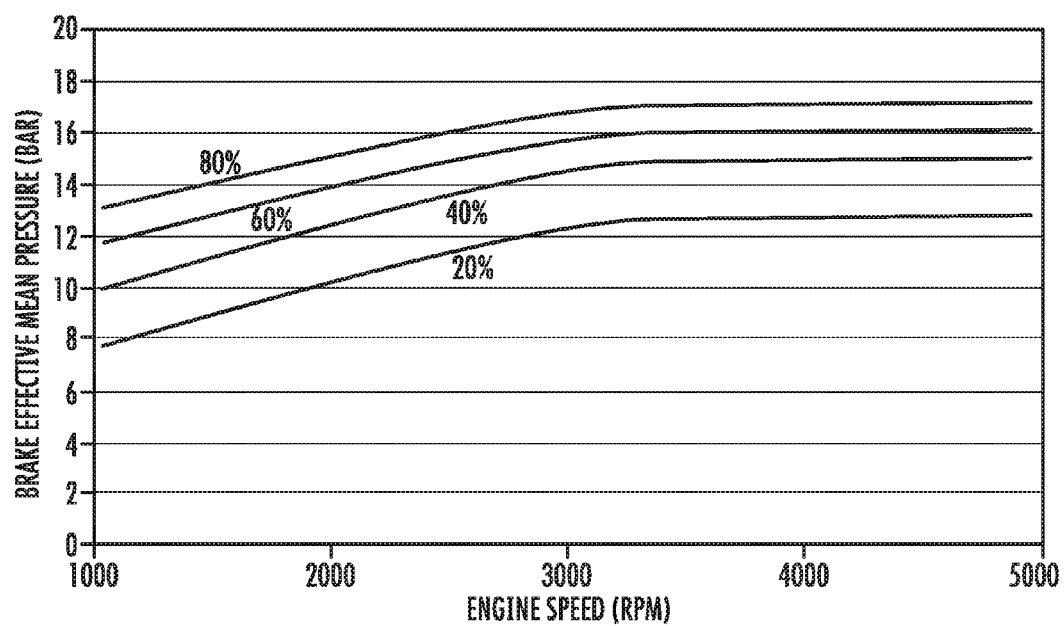
FIG. 5 shows an illustrative fraction of gasoline that needs to be directly injected in order to prevent knock for a turbocharged engine with a compression ratio of 10.

This is done using maps of the requirement for the fraction of fuel that must be directly injected in order to prevent knock. FIG. 5 shows a typical result, for a pressure boosted DI/PFI engine using regular gasoline and with a maximum manifold air pressure (MAP) of 1.7 bar and a compression ratio of 10. As shown in FIG. 5, the fraction of directly injected fuel that is required to prevent knock varies with both torque and speed. At a given torque, the fraction of fuel that is directly injected decreases with increasing speed. Thus, if 100% direct injection is required for knock control at highest torque at low speeds, the fraction of fuel that needs to be directly injected can be less than 100% at higher speeds. The engine may operate with 100% of directly injected fuel at high speeds and less than 100% at other speeds. Alternatively, it may operate with less than 100% of directly injected fuel throughout the highest torque regime with less directly injected fuel used at high speeds.

It is assumed in FIG. 5 that the port fuel injected fuel is introduced into the engine in the conventional way with the inlet valve closed and hence produces essentially no vaporization cooling. The results of the model can be used to heuristically describe the particulate emissions behavior for both naturally aspirated engines and for engines that are pressure boosted by turbocharging or supercharging.

No effect of spark retard is assumed in FIG. 5. Increased spark retard at a given brake mean effective pressure and speed would reduce the fraction of fuel that would need to be directly injected and thus reduce particulate emissions. Spark retard can be selectively applied to minimize adverse effects on efficiency and performance for a given amount of particulate emission.

Using the information from FIG. 4 that estimates the PM generation over the map for a fully directly injected engine together with that of FIG. 5, where only enough directly injected fuel is used for knock avoidance, the PM generation over the engine operation map can be calculated. By injecting a fraction of the fuel by means of port fuel injection, the amount of directly injected fuel decreases, and it can be possible to reduce the time of injection below the maximum injection time allowed without fuel impingement on the piston. Thus, a higher level of torque can be used without exceeding the amount of directly injected fuel that would cause the threshold level for fuel impingement and particulate emission to be exceeded.

Thus, in addition to linearly reducing particulate emission throughout the drive cycle by reducing the fraction of fuel provided by direct injection, it is also possible to further reduce it by a large amount, or possibly essentially eliminate it altogether according the present model, over a substantial region of the operating map. This is accomplished by the fuel management system controlling the amount of fuel that is directly injected so that it is kept below a selected level above which wall wetting would increase in a non-linear way and there would be rapid increase.

In addition to being used in combination with the information in FIG. 4, the information in FIG. 5 can also be employed to estimate the fraction of fuel that needs to be directly injected (to prevent knock) over a drive cycle. For the UDDS drive cycle, the fraction is around 1%. For the aggressive US 06 drive cycle, the fraction is around 10%. For the combined city-highway drive cycle, the fraction is around 5%. This drive cycle information can be used to make a rough estimate of the relative amount of particulate emissions for PFI+DI operation versus DI operation in the case where particulate reductions from the model for wall wetting are not taken into account. This could be a useful way to estimate the effect of PFI+DI in reducing particulate emissions during cold start.

For example, if the ratio of particulate emissions for DI to particulate emissions for PFI is R, an estimate of the fractional increase in particulate matter that is emitted is that it is equal to $(1-f)+(f*R)$, where f is the fraction of directly injected fuel used in a drive cycle. Thus if R=10 and for the US 06 cycle, f=0.1, the fractional increase in particulate emissions is 0.9+(10) (0.1), or ~2 greater than PFI emissions. The reduction in cold start emissions can be further reduced by various adjustments, such as spark retard or variable valve timing. For the UDDS and combined city-highway drive cycles, the fractional increase without adjustments would be much smaller. It can be possible to reduce the amount of particulate emissions using a 100 second cold start period by more than 80% without spark retard and by more than 90% with spark retard relative to what it would be if only direct injection were employed.

These estimates indicate that with minimization of the fraction of fuel that is directly injected and with various adjustments, the engine-out particulate emissions from engines using optimized PFI+DI operation can be reduced to the low levels approaching those of PFI engines. Optimized PFI+DI operation could provide direct injection particulate reduction that is comparable to that provided by gasoline particulate filters that have a particulate removal efficiency of around 90%.

In addition to the wall wetting effect, there could also be fuel vaporization effects that could also result in a rapid increase in particulate emissions above certain combinations of torque and speed. The fuel management system could also use information regarding the instantaneous fueling rate and engine speed as a basis for determining the values of torque and speed at which control adjustment is needed.

Figure 6:
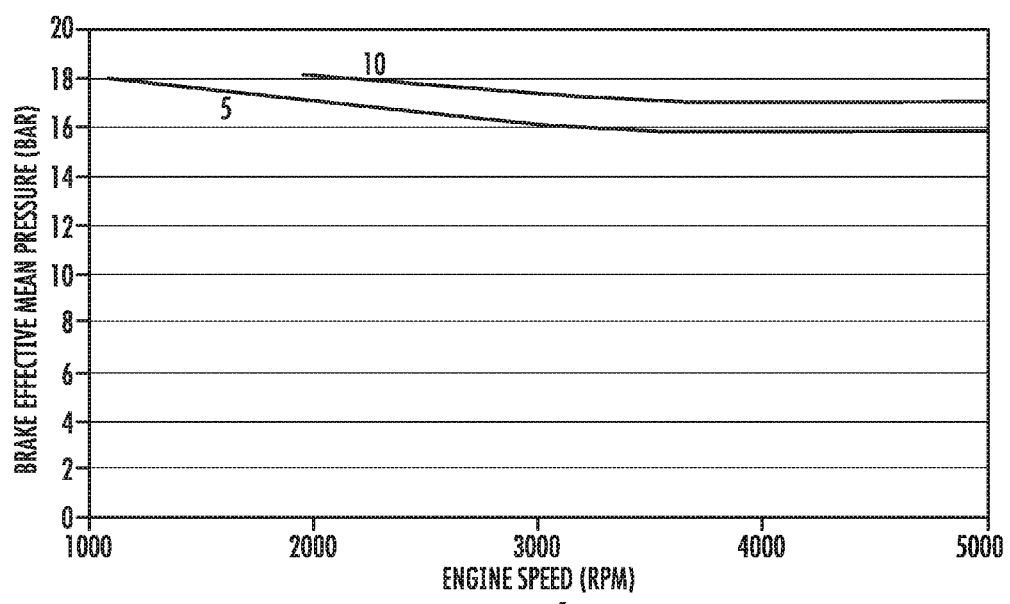
FIG. 6 shows illustrative particulate matter (PM) generation (in arbitrary units) for a turbocharged engine using PFI/DI and minimization of the DI fuel, having a compression ratio=10.

FIG. 6 shows the results of the model for a turbocharged or supercharged gasoline DI/PFI engine based on the information in FIGS. 4 and 5. The BMEP is such as to enable a downsizing by a factor of 1.7 over a naturally aspirated engine that does not use direct injection. The compression ratio is 10. The amount of DI fuel that is used is minimized by matching the amount to that needed to prevent knock at a given value of torque and speed and providing the rest of the fuel by PFI. No change in spark retard is assumed. Minimization of particulate emissions is obtained by matching the fraction of fuel that is directly injected to that needed to prevent knock over at least the torque and speed range where the amount of directly injected fuel would otherwise be greater than the threshold level.

The model shows that the particulate emissions have a strong dependence on BMEP, or equivalently torque, as a result of the combination of the dependence of particulate emissions on the amount of directly injected fuel, equivalent to a combination of torque and speed, and the dependence of the fraction of fuel that must be directly injected to prevent knock. For the set of assumptions used in the model, it is possible to somewhat reduce PM generation at the highest loads and altogether eliminate them through most of the operating map.

The model has been used to determine emissions for the UDDS and the US06 cycles. These model results are meant to serve more as general guidance for optimizing particulate control rather providing accurate numerical values for engine operation. Particulate reduction can be tuned to the desired level by using spark retard and other adjustments to obtain the desired particulate reduction for actual engine operation. For a given engine speed, there is a threshold torque above which a threshold increase in particulate emissions occurs. This threshold torque can be increased with spark retard. Other adjustments, such as variable valve timing, can also be employed to increase the threshold torque.

The results are shown in Table 1. The calculations also do not include the PM generated during cold start, which is not captured by the model. They also do not include the effect of increased spark retard.

Based on the model, because UDDS is such a light load cycle, it does not result in any particulate emission, even with use of DI alone throughout the drive cycle. In contrast, there are relatively large particulate emissions for the US 06 cycle using DI alone and these emissions are substantially reduced by substitution of port fuel injection for direct injection. Table 1 shows that particulate emissions are reduced by more than 90% relative to the use of DI alone. Use of spark retard could substantially further decrease the particulate emissions for the US O6 cycle using PFI/DI. Based on these model results for the case where spark retard is not employed and the large impact that spark retard can have in reducing the fraction of fuel that must be directly injected so as prevent knock, the particulate emission level during warmed up engine operation can be reduced by at least 90% relative to what it would have been if only direct injection were utilized.

TABLE 1

Relative particulate matter number for DI alone and PFI/DI for the UDDS and US06 drive cycles

|  | DI | PFI/DI |
|---|---|---|
| UDDS | 0.00 | 0.00 |
| US06 | 1 | 0.07 |

Figure 7:
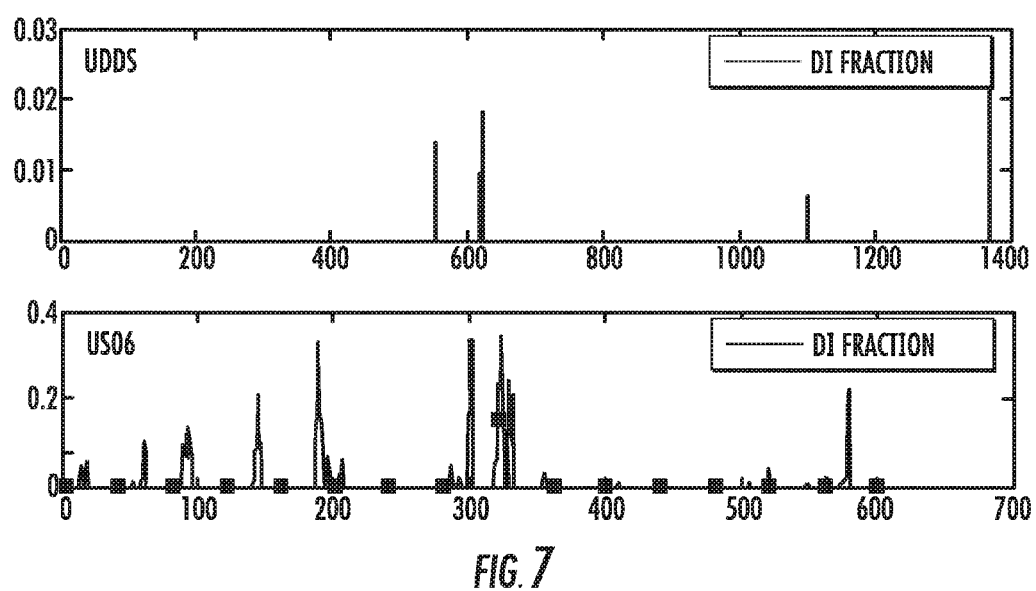
FIG. 7 shows the DI fraction of fuel for an engine with a manifold air pressure (MAP) of 1.7 bar (absolute), for both the UDDS and US06 cycles as a function of time.

The fraction that must be directly injected in order to prevent knock (borderline knock) is shown in FIG. 7 for both the UDDS and for the US06 cycles, again for a downsizing of about 1.7. The instantaneous fuel usage for the cycle is shown in FIG. 7, as a function of time during the cycle (about 1400 s for the UDDS and 600 s for the US06). There is very little DI in the UDDS, and thus very little impingement on the piston.

The model results show that because of the threshold effect, minimizing use of direct injection by continually matching the fraction of fuel that is directly injected to that required to prevent knock throughout the range in which direct injection is needed for knock prevention can have a large impact on particulate reduction.

Control System Adjustments

In addition to reducing particulates by matching the fraction of fuel that is directly injected to the requirement to prevent knock as torque and speed change and thus minimizing its use, there are a number of other control features that can further reduce particulate emissions in warmed up engine operation.

Adjustments can be made at certain values of torque and speed to reduce the fraction of fuel that is directly injected so as to increase the torque at which particulate emission starts to rapidly grow through the onset of piston wetting, as illustrated in the model results in FIG. 6. This reduces the torque-speed region in which piston wetting leads to substantial particulate emissions. The adjustments reduce the direct injection fraction of the fuel that is required. They include but are not limited to increased spark retard, variable valve timing and/or open valve port fuel injection.

The fuel management system can be operated so as to minimize the drive cycle fuel efficiency decrease for a given amount of drive cycle particulate reduction provided by use of an adjustment. The adjustment would be used in certain ranges of torque and speed where it would provide the greatest reduction in particulate emissions for a given a given decrease in drive cycle efficiency.

The level of the adjustment could be matched to the need to prevent knock as torque is increased without increasing the amount of fuel that is directly injected. For example, an increase in spark retard could be employed at low torque end of a given torque range and continuously increased as the torque increased so as to prevent knock.

An adjustment could also be used to reduce particulate emissions when piston wetting is occurring and there is a linear dependence of particulate emissions on the amount of directly injected fuel Another adjustment that can be made is to temporarily increase the pressure of the fuel in the injector. This enhances this PM reduction opportunity by achieving several objectives. Because of the higher fuel pressure, the delivery rate increases. With shorter injection times, piston wetting can be avoided at all but the highest loads and engine speeds. The increased fuel pressure also results in smaller droplets. The smaller droplets evaporate faster and are more likely to be entrained in the flow, instead of separating (due to inertial forces) from the flow due to centrifugal acceleration when the gas turns around before a solid surface. The temporary increase in the pressure of the direct fuel injector can be used when it has the greatest impact in reducing particulate emissions. Examples are use in the high torque regime and in the regime of high torque and speed.

Stratified Injection

Although the model results and control approaches that have been described above are for directly injected fuel that is injected in a uniform way into the engine cylinders, they can also be applied to stratified direct injection. The stratified direct injection is used to increase efficiency by facilitating dilute and open throttle operation at low loads.

At low loads, the fuel could be supplied entirely by stratified DI or mainly by stratified DI. Thus, at low loads, the fraction of fuel provided by DI would be much greater than the zero or small fraction of fuel by DI that is needed to prevent knock in this low torque region. As the torque increases, knock would be prevented by the use of the high fraction or complete use of DI. However, at a sufficiently increased value of torque and speed, the required injection time for the DI fuel becomes such that piston wetting would occur unless some PFI displaces DI fuel, preventing wall wetting. The fraction of fuel provided by direct injection would then be reduced to reduce the amount of directly injected fuel and prevent the wall wetting. At even higher loads, knock constraint results in increased need of DI fuel, with the consequence that limited wall wetting will occur and particulate emissions will occur.

Figure 8:
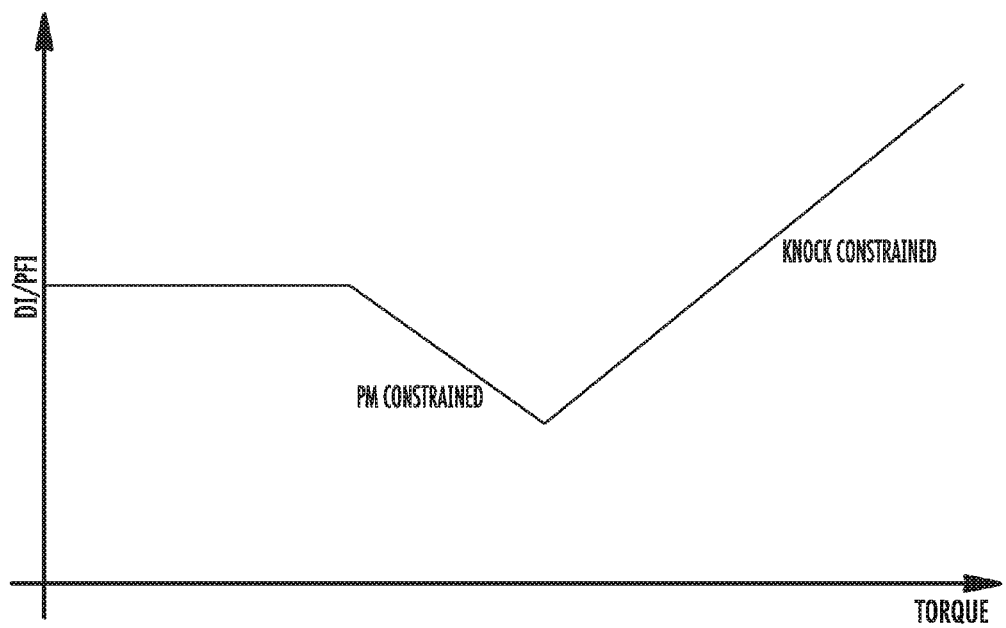
FIG. 8 shows an illustrative ratio between DI and PFI as a function of torque, for a given engine speed, so as to constrain particulate emissions and prevent knock while utilizing a high fraction of DI at low torque. This is a representative scenario for stratified direct injection.

FIG. 8 shows the ratio of DI fuel to PFI fuel as a function of torque for this type of fueling scenario for stratified direct injection. At lower values of torque, the DI/PFI ratio is determined by the constraint of reducing PM emissions. Above a certain value of torque, the need to prevent knock is the dominant constraint and the resulting higher amount of directly injected fuel increases particulate emissions.

Another use of DI, other than for knock suppression, is its use to very accurately meter the amount of fuel injected into the cylinder during rapid changes while PFI is employed for steady state or slowly changing engine operation. DI could be used for optimizing control during transients where the improved fueling metering allows for more precise delivery of the fuel, avoiding need for enrichment usually required from PFI in order to achieve a substantial increase in power. Particulate formation with PFI is usually determined by periods of rich operation; it could be minimized by DI during a transient, with slow adjustment of PFI/DI split.

Cold Start

Reducing particulate emissions that occur during a cold start period of 100 seconds or so after the engine has been started can be made easier than in warmed up operation by two factors. First, there will generally be a lower average directly injected fraction of fuel that will be required to prevent knock in this cold start portion of the drive cycle, since cold start driving will be less aggressive (less high torque operation) in comparison to driving when the engine is warmed up. A representative drive cycle for cold start driving could be comparable to the UDDS cycle where, as discussed previously, the average direct injection fraction around is around 1% and the fractional increase in particulate emissions relative to PFI operation would only be less than 1%.

Minimizing the fraction of DI used to prevent knock as torque increases and decreases during the cold start period for very high particulate emissions could thus be sufficient to reduce particulate emissions relative to use of DI alone to less than 20% and preferably less than 10%.

Second, if this is not sufficient, the short time duration of cold start and the resulting small impact on overall drive cycle engine efficiency of an adjustment (such as spark retard) can allow greater use of adjustments to further reduce the fraction of fuel that is directly injected at a given value of torque and speed so as to provide greater reduction in direct injection use and particulate production from what would have otherwise have been the case.

The fuel management system can be operated so that the average fraction of fuel in the cylinder that is provided by direct injection during the cold start period at which very high particulate emissions occur is either limited to be less than a selected value by minimization of use of direct injection as torque is increased without a change in spark retard (or another adjustment); or, if necessary, increased spark retard is introduced to achieve this limitation by decreasing the fraction of directly injected fuel that is needed to prevent knock. During a cold start portion of the drive cycle of 100 seconds, the average fraction of fuel in the cylinder that is introduced by direct injection is controlled to be less than it is in warmed up operation.

The amount of spark retard can be controlled by look up table or by closed loop control. The spark retard could be a constant level during all or part of the drive cycle or can be varied as torque changes.

The cold start periods, when the engine operation needs adjustment for cold cylinders, cold exhaust treatment catalyst, cold manifold and for very high levels of particulates, can occur for different time durations. The time duration for an engine adjustment, such the use of increased spark retard, that is optimized for reducing cold start direct injection particulate emissions can be determined by a set time, a look up table or by engine sensors that monitor parameters that include, but are not limited to, engine coolant temperature. The cold start period during which very high particulate emissions occur is typically around the first 100 seconds or so of engine operation. This cold start period can be longer than the cold start period during which the catalyst for exhaust treatment needs to be heated.

Using spark retard, it may be possible to use port fuel injection alone or almost entirely during the 100 second or so cold start period for very high particulate production. The fuel management system will limit the amount of spark retard so that a high level of spark retard will not cause misfire. A misfire detector can be used as input for this control. Open loop control using a lookup table can also be employed as well as closed loop control using a knock detector. The fuel management system can control the spark retard so that during at least some time during cold start, the spark retard is increased so as to provide the largest decrease in the fraction of fuel that is directly injected without creating misfire.

Other adjustment or adjustments, such as variable valve timing and/or open-valve port fuel injection, could also be employed. The vaporization cooling knock resistance that is provided by open-valve port fuel injection can be used as an alternative to direct injection. The same fuel injector could be used for both closed and open valve port fuel injection by changing timing.

These adjustments would be made during at least a portion of the cold start period, when the fuel management system matches the fraction of fuel provided by direct injection to the increase required to prevent knock as torque and speed change so as to require more knock resistance and to match the decrease allowed as torque and speed change so as to require less knock resistance.

The fueling scenario for the cold start period of 100 seconds or where higher particulate emissions occur, can use introduction of fuel into at least one cylinder by port fuel injection and where the fuel is introduced by the direct injection, if needed, so as to prevent knock as the torque increases. As torque increases, the fraction of fuel that is directly injected can be increased so as to match the amount needed to prevent knock (and thereby minimize the fraction of fuel that is directly injected). Spark retard can also be increased during at least part of this cold start period so as to prevent knock that would otherwise occur. At the highest value of torque in the cold start portion of the drive cycle, the engine could be operated with only port injection or with a combination of port and direct injection where the fraction of fuel provided by direct injection is reduced by the use of increased spark retard and/or another adjustment, such as variable valve timing. Variable valve timing can also be used together with increased spark retard during at least part of this cold start period. Spark retard and other adjustments may be controlled based upon the torque and speed at which a large threshold increase in particulate emissions occurs.

An additional adjustment that can be used during the 100 second or so cold start period for very high particulate emissions is to temporarily increase the pressure of the direct injector during at least part of this period so as to reduce particulate emissions. The relatively short time period of the cold start period could facilitate deployment of this adjustment.

A further adjustment is to limit the amount of pressure boosting that is employed by a turbocharged or supercharged engine. This reduces the required fraction of fuel that must be directly injected.

Since there can still be substantial PM emissions from PFI during the cold start portion of the drive cycle, it may also be necessary to employ means to reduce these emissions. One approach is to use air heating from engine compression as described below. Air heating can also be employed to reduce particulate emissions from direct injection.

Fuel Management System Optimization

Figure 9:
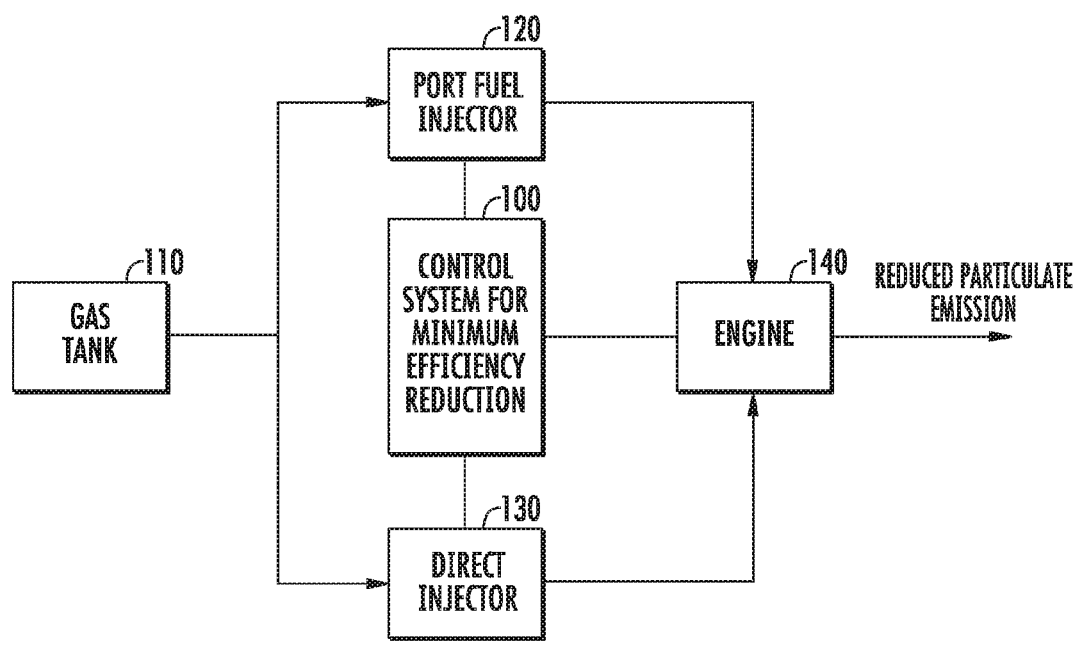
FIG. 9 shows an engine control system for adjusting engine operation and/or ratio of directly injected fuel and port-fuel injected fuel to reduce particulate reduction with minimum drive cycle efficiency reduction.

A control system 100, shown in FIG. 9, can be employed to control the adjustments so that the particulate emission levels meet regulations, while keeping the decrease in efficiency over a drive cycle below a selected value. The amounts of gasoline from the fuel tank 110 that are injected by port fuel injectors 120 and direct injectors 130 into the engine 140 are controlled by using information that includes the amount of fuel that is directly injected into the engine 140 and other inputs that include but are not limited to direct injector pulse length and the detection of misfire.

The control system 100 also controls various engine operation adjustments that affect the amount of direct injection that is required to prevent knock.

The control system 100 can also employ the adjustments so to limit the efficiency decrease from the adjustments so that it is no greater than a selected value and/or so that the performance decrease is no more than a selected value. The control system 100 can employ a look up table that provides information on which combination of adjustments (type of adjustment, what portion of the drive cycle, and how much is employed) provides the lowest efficiency reduction for a given particulate reduction. The engine can be operated at times at above the threshold for particulate production as well as below it.

The control system 100 can also be used to employ optimized port+direct injection to obtain better engine efficiency by dilute operation through greater use of EGR (internal or external) at low loads by minimizing DI use. Minimizing DI use can also be used to increase efficiency by extending the limit for operation with a lean fuel/air mixture at low loads, thus providing an additional way for providing dilute operation. The control system 100 can also be used to provide better fueling control at high speeds and high loads by minimizing the amount of direct injection at a given torque and speed that is needed to prevent knock as the torque is increased without compromising efficiency and performance.

The amount of direct injection is minimized by matching its level to the amount needed to prevent knock as torque and speed are changed. Variable valve timing can be used to increase knock resistance, thereby reducing the fraction of fuel that is directly injected, and can vary internal EGR level to increase efficiency.

The approaches described herein can make it possible to use a combination of port and direct injection to reduce particulate emissions to a level that would meet stringent future regulations without using a gasoline particulate filter. They could also make it possible to meet this goal without requiring closed loop feedback control from instantaneous measurement using a particulate measurement sensor and or other use of a sensor for measuring particulate emissions over time.

During the cold start period, the control system would achieve sufficient reduction of particulate emissions by the combination of matching the fraction of fuel that is directly injected to the amount needed to prevent knock. This matching could use closed loop control from a knock sensor and could also use open loop control. The use of open loop control can be particularly important during transients. In addition, spark retard would be used to further reduce the amount of direct injection that is used. The amount of increased spark retard could be controlled by a knock detector and by a misfire detector.

The amount of spark retard would be limited by the requirement not to misfire. Maximum spark retard could be used in a preset fashion so as to minimize the amount of direct injection that is employed. The length of this cold start operation could be determined by a preset time or by measurement of engine temperature. The use of spark retard could be determined by the fraction of fuel that is directly injected. If this fraction becomes too high based on a look up table that correlates particulate emissions with the fraction of fuel that is directly injected, spark retard is used. The look up table could be determined by measurements of particulate emissions from a test engine. It could be also be determined by the results of an engine model.

During the warmed up engine portion of the drive cycle, minimizing the fraction of fuel that is directly injected would be achieved by matching of the fraction needed to prevent knock. The matching would utilize closed loop control employing a knock detector and could also use open loop control that employs a look up table. Open loop control using a look up table could be especially important during transients, which include rapid changes in torque and during engine shutdown and restart. Spark retard and, if needed, other adjustments such as variable valve control, could be used to further reduce particulate emissions by reducing the fraction of fuel that is directly injected. This would prevent the amount of directly injected fuel from exceeding the threshold for the amount of directly injected fuel to produce a large percentage increase in particulate emission.

The amount of spark retard or another adjustment that is used could be determined by the amount of directly injected fuel or by parameters from which it is inferred and a look up table based on the use of calibrated model for when the threshold occurs. The amount of spark retard and perhaps other adjustments could be used in an optimized way to minimize any decrease in efficiency and performance for a given amount of particulate reduction.

Alternatively, during the warmed up portion of the drive cycle, spark retard can be controlled with information about engine torque and speed so as to increase the threshold torque at a given speed at which a threshold increase in particulate emission would otherwise occur.

An additional control feature is the timing of DI injection with the constraints needed to prevent wall wetting. The DI injection is set so that the start of injection (SOI) and the End-of-Injection (EOI) are adjusted in order to prevent wall wetting. In the case where the injection duration is less than that the maximum injection duration that would result in wall wetting (either because of early wall wetting during the intake stroke or late wall wetting during the compression stroke), the injection timing can be adjusted within the limiting times for wall wetting avoidance. Earlier injection results in better mixing, while later injection results in more stratified charge, which could be beneficial for misfire or knock avoidance.

As an alternative to removing the need for a gasoline particulate filter to meet requirement for reducing particulate emissions, the port+direct injection fuel management system described here could be used in combination with a gasoline particulate filter to provide a greater reduction in particulate emissions than could be obtained with the gasoline particulate filter alone. Further, the combination could also reduce the cost and mitigate reliability and efficiency reduction drawbacks of the gasoline particulate filter system.

The combination of PFI and DI for particulate control can be employed to reduce the requirements on the particulate reduction required from the gasoline particulate filter; the degree of control required by filter; the range of conditions under which it is used; and its durability. They can also remove the need for instantaneous monitoring of particulate emissions.

Engine Air Preheating Enabled by Variable Valve Timing

Further reduction in particulate emissions from optimized port+direct injection can be obtained by reducing port fuel injection particulate emissions, especially at cold start.

An important factor in cold start particulate matter emissions is poor vaporization of the fuel. The air is cold, and so are the cylinder walls (liner and piston), the inlet manifold and the inlet valve. Vaporization could be improved and emissions decreased if the air temperature could be increased. Providing an air heater is not practical due to the transient nature, with the heater being effective long after it is really needed.

Heating the air does not require much power, but if it is heated through contact with a surface (i.e., a conventional heater), the thermal mass of the heater dominates and results in a long transient. Use of variable valve timing, for air pre-heating by engine compression, is a means to address this issue. Engine compression can provide a very effective means for air preheating. This approach is enabled by progress that has been made in variable valve timing.

It is possible to heat the cylinder charge during the cold start to minimize emissions, including hydrocarbon gas emission as well as particulate emissions. Cold gas temperature, as a result of cold walls that are in contact with the gas charge, can result in poor fuel evaporation and contribute to a large overfueling to compensate for poor evaporation. The overfueling results in a substantial fraction of the total hydrocarbon emissions over a driving cycle, as well as substantial fraction of particulates.

The power required to heat the gas is not high; however, because of finite heat capacity of heat exchangers, there is a substantial delay in delivering energy to the gas by solid elements. By the time that these elements are heated, the cold start period may be over.

An alternative means of delivery the heating is through compression heating of the gases. In the cylinder, during the gas compression, there is also associated heating. If the valves have sufficient authority for adjustment during the cold start period, it is possible to heat the gases in the cylinder and recirculate them back to the inlet manifold, where they can vaporize the fuel as well as reduce the amount of throttling needed.

Figure 10:
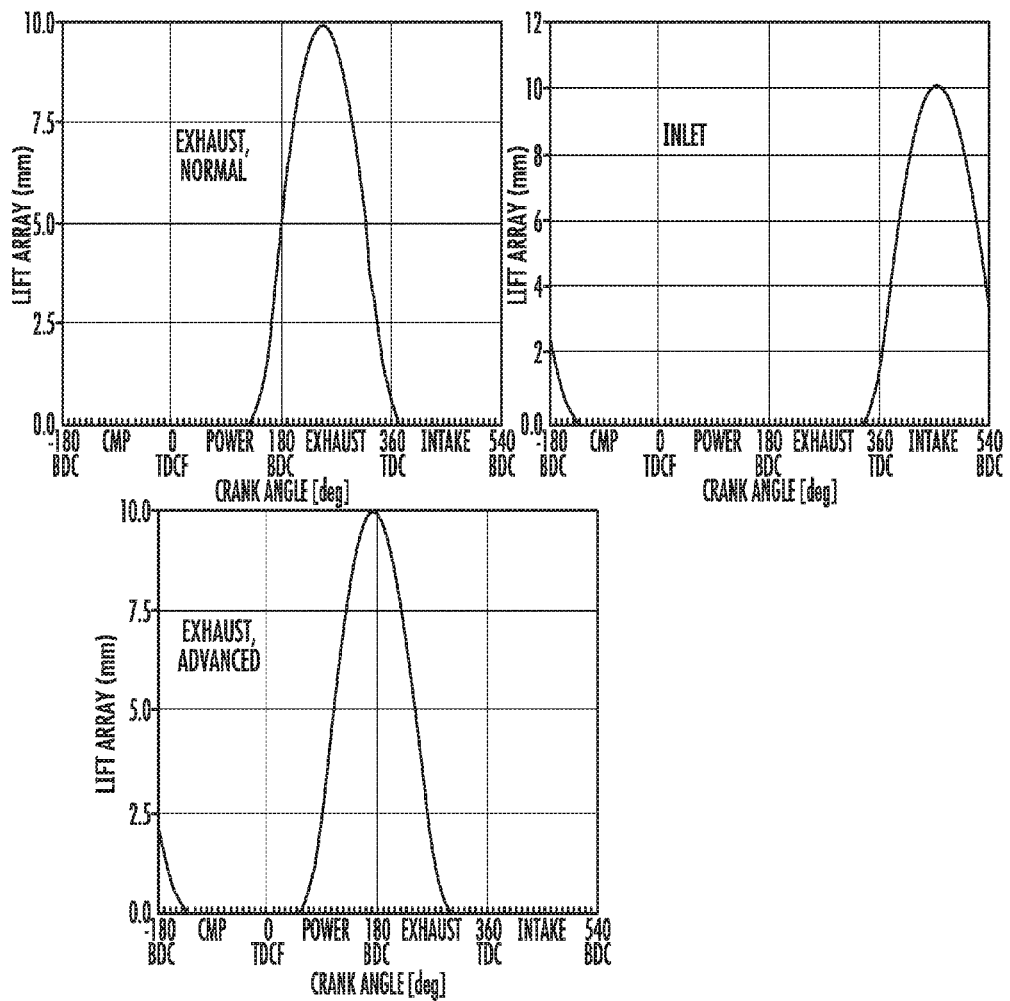
FIG. 10 shows normal (top) inlet and exhaust valve lifts and advanced exhaust valve lift. The inlet conditions remain constant for both.

This approach has been modeled using an engine simulator. FIG. 10 shows the valve lift as a function of the crank angle during two conditions. The first one is normal values for the valve timing. The second one is for a highly advanced exhaust valve opening (and correspondingly, early exhaust valve closing). For the model, the compression ratio is assumed to be 9, and the engine operating speed is 200 rpm. The inlet gas temperature, as well as the reflux from the exhaust, is assumed to be 280 K.

Figure 11:
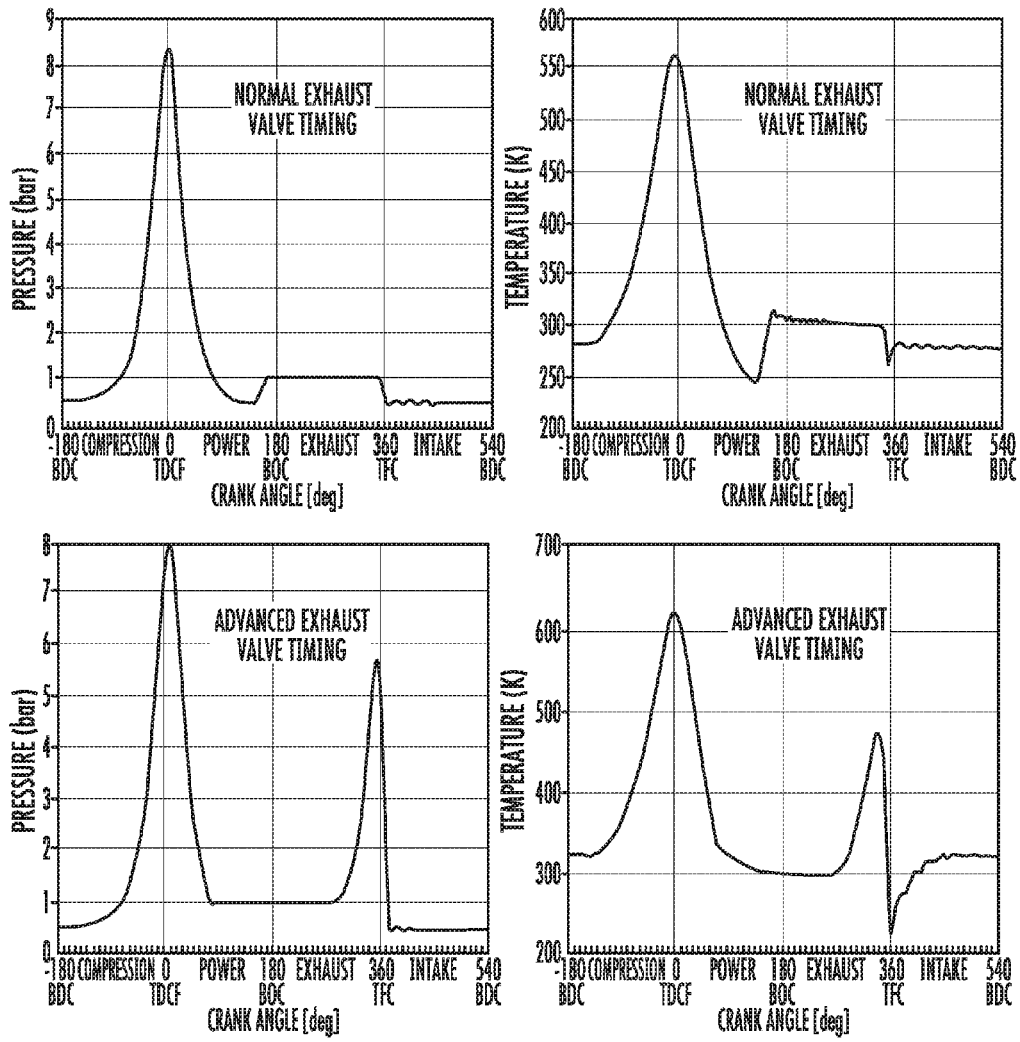
FIG. 11 shows pressure (left) and temperature (right) for conditions of normal valve timing (top) and advanced exhaust valve timing (bottom). Note the increase in inlet temperature.

In order to investigate the potential for gas heating, the exhaust valve timing has been considerably advanced. The conditions for gas temperature and cylinder pressure are shown in FIG. 11 for both the normal exhaust valve timing as well as advanced timing. During the exhaust part of the cycle, the exhaust valve closes early, allowing the gas remaining in the cylinder to compress and heat. The compressed warm gas then leaves the cylinder at high velocity entering the inlet manifold during the early stages of the opening of the inlet valve, and then reenters the cylinder during the intake part of the cycle, after having vaporized some of the fuel in the inlet manifold. The heating can be greater than 30 K. In the case assumed in FIG. 11, the heating is about 50 K. Note that in the first case with normal valve timing, the gas at the bottom of the cycle is actually a little cooler than during the inlet, due to heat exchange between the cylinder charge and the cold cylinder walls.

Significant power is required to drive the compression. For the case shown in FIG. 11 with normal exhaust valve timing, for a cylinder with a 93 mm bore and 81 mm stroke, the power required for the cycle is around 10 W (normal exhaust valve timing). For the advanced exhaust valve timing used in the air preheating, it is preferred that the cranking power is at least 100 watts and less than 1000 watts. It is preferred that this cranking power would be provided by a 12 volt battery that provides power for other functions in a vehicle. However, it could be provided by an additional 12 volt battery or by a higher voltage battery used in a hybrid vehicle.

For the case in FIG. 11, heating of around 50 K is provided by an advanced exhaust valve timing of 40 crank angle degrees (CAD). The cranking power is 140 W, mostly going into compression of the gas rather than heating. If instead the exhaust valve is advanced 30 CAD, the power reduces to about 100 W, but the heating is only about 20 K. It is preferred that the exhaust valve timing is advanced by at least 30 crank angle degrees and less than 60 crank angle degrees.

The inlet manifold pressure is assumed to be 0.5 bar, while the exhaust pressure is assumed to be 1 bar. It may be possible to perform this non-combustion gas heating cycle for a single cycle for each cylinder, followed by conventional cycle. Before the non-combustion gas heating cycle, there is no fuel added to the inlet manifold and the spark is either not used or ineffective as there is no fuel. The second cycle is fired conventionally, with fuel injected prior to the inlet valve opening. In this manner, better air/fuel preparation can be achieved for port fuel injection that will reduce particulate and hydrocarbon emissions during cold start.

The technique could also be used for direct injection, with direct injection occurring during the second cycle, with heated gasses.

It may be possible to have several cycles of operation in this mode, where a non-combustion gas heating cycle is followed by a power cycle, before the engine fully warms up.

Figure 12:
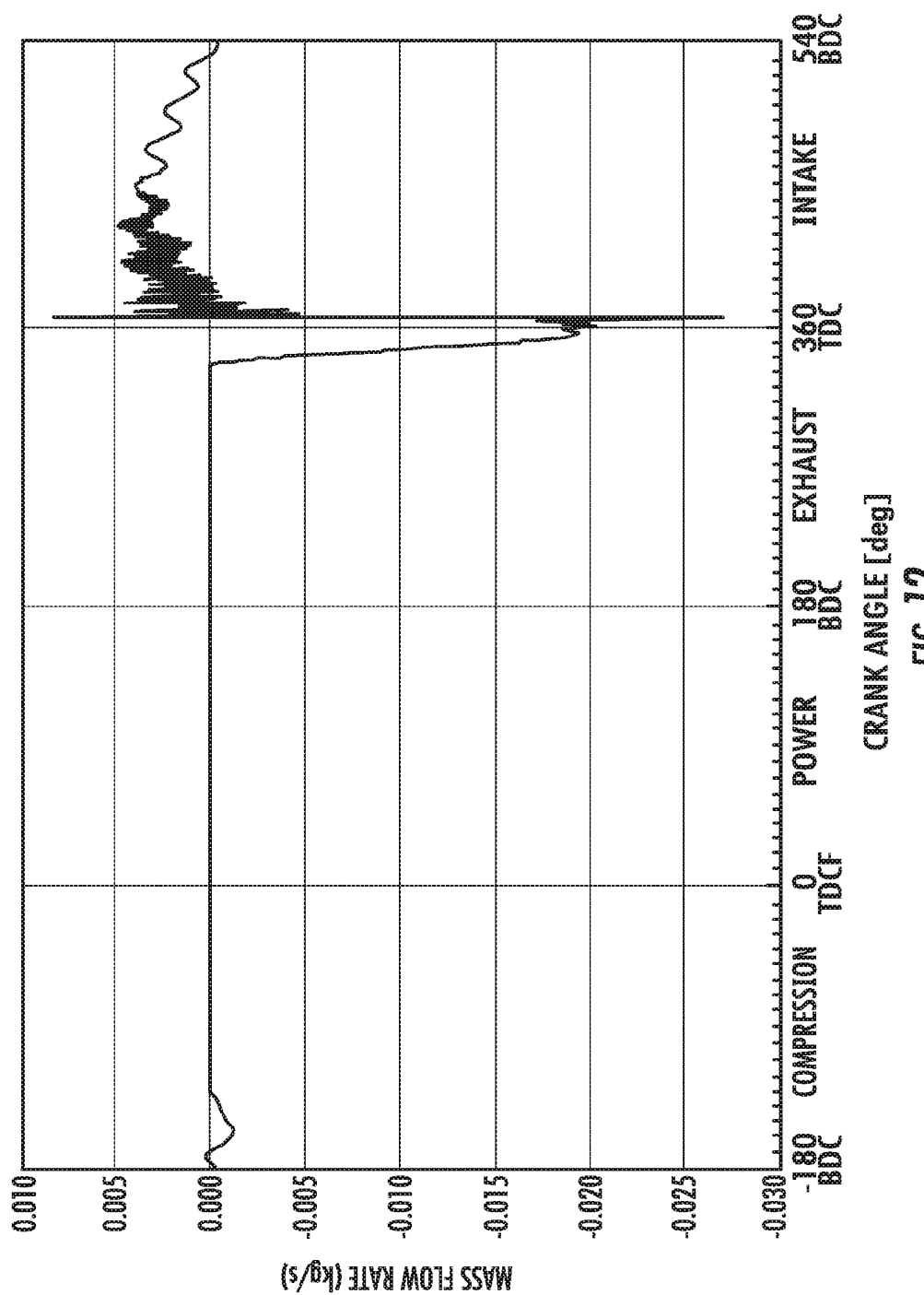
FIG. 12 shows mass flow rate through the inlet manifold valve for the case of advanced exhaust valve timing.
Figure 13:
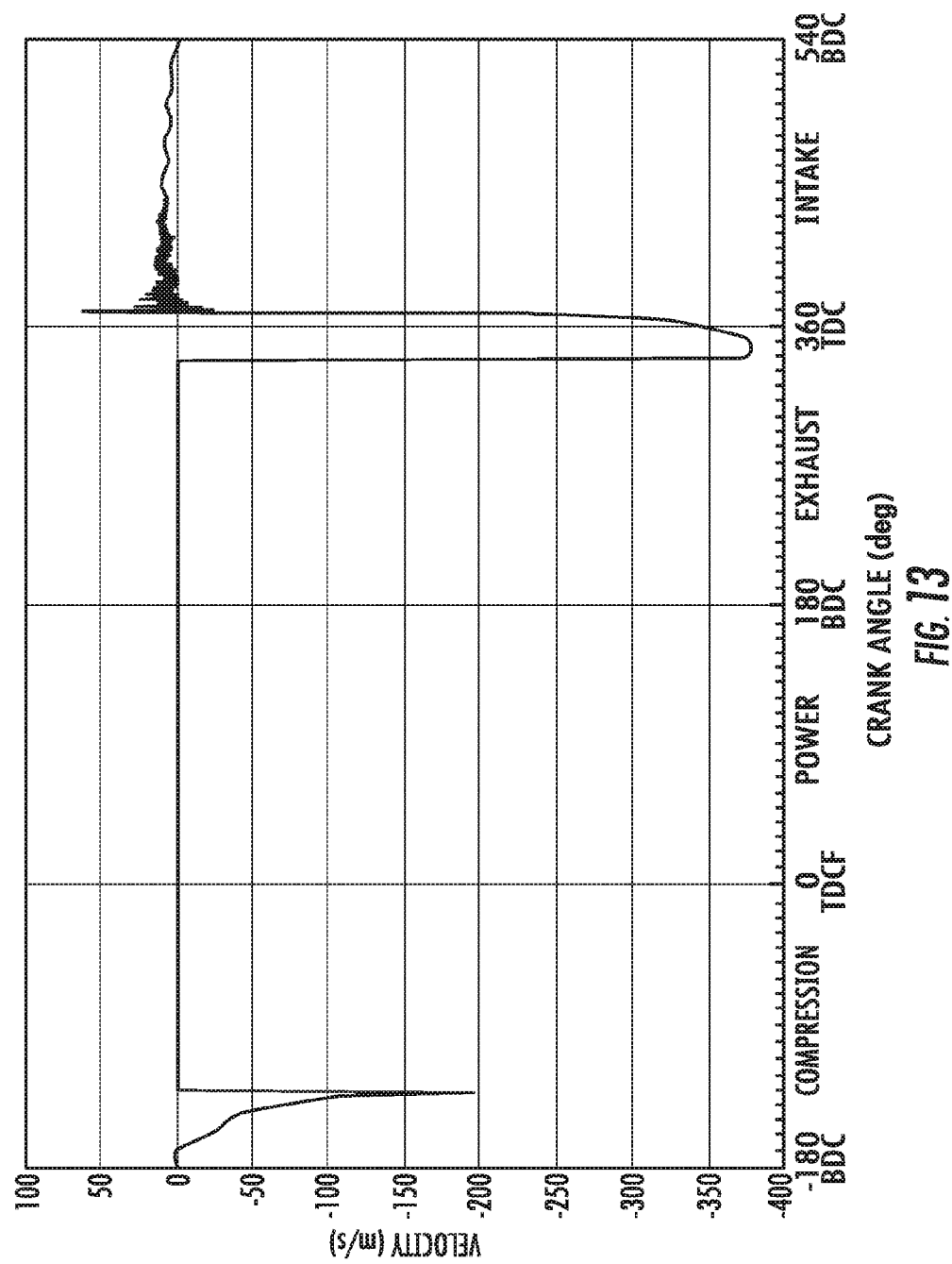
FIG. 13 shows gas velocity across the inlet manifold for the case of advanced exhaust valve timing.

FIG. 12 shows the very large mass flux back from the cylinder to the inlet manifold of hot gases. The flow velocity across the valves is sonic, as choke flow is established for the conditions shown in FIG. 10-13 (could be adjusted by adjusting the valve lift profile and its timing to set the desired the flow reversal process).

The compression of air in the cylinder results in heating during the compression cycle or during the exhaust cycle, if the exhaust valve is adjusted so that air is prevented from leaving the cylinder. In this concept, variable valve timing with or without variable valve lift is used during engine startup to draw air into the cylinder and then sent back at higher temperature back into the inlet manifold (reflux), where it can be used to assist in the vaporization of fuel. In this non-combustion air heating cycle, no fuel is introduced into the cylinders by the fueling system, and the spark from the spark plug is not employed. The heated air improves vaporization of fuel that is deposited on the inlet valves, either prior to the engine combustion start-up or during the fueling process (by port-fuel injection).

During the expansion cycle, there is cooling of the cylinder charge. If the system were totally reversible (i.e., adiabatic), the initial temperature of the air prior to the compression cycle would be same as that at the end of the expansion cycle. Because of losses to the walls, it is slightly lower. Indeed, FIG. 10 shows that situation. With normal exhaust valve timing, note that the temperature of the gas at bottom dead center after the expansion stroke is substantially lower than the inlet temperature, actually by as much as 30 K. In the case with advanced exhaust valve timing, the temperature of the inlet manifold (320 K) is actually higher than the outside temperature (280 K). The temperature during the flow reversal could be as high as 500 K. It should be noted that the calculations in FIGS. 10-13 are for "steady-state" calculation to illustrate the potential for the technology, but even in the case of the transients, the trends are similar.

This analysis shows that the temperature of the gas in the region close to the inlet valve can be increased by over 150° C., even in the case when the engine is already firing, improving the evaporation of the fuel on the valves, as well as large increase in the velocity of flow back gases (up to choke conditions).

There are several embodiments for the engine air heating. One preferred embodiment is where the exhaust valve timing is substantially advanced. In this case, warmed-up air can be reintroduced to the inlet manifold (flow reversal), as shown in FIGS. 10-13. The amount of air that is re-fluxed can be controlled by control of the valve timing with or without control of variable valve lift and by exhaust valve timing. The amount of preheating is controlled by the timing of the opening of the valve. The pressure in-cylinder would be higher than the pressure in the inlet manifold, and the warmed-up hot air would flow at high speed through the valve opening (which could be controlled by variable valve lift). The pressure differential across the inlet valve in the case of FIGS. 10-13 is about 6 bar. It is not necessary to have such a high value, as it results in increased power demand. Lower pressure would correspond both to lower temperatures of the reverse flow as well as lower power demand. The valve lift can also be adjusted to control the velocity of the flow through the valve, both during the time of reflux (when the cylinder charge is returned to the inlet manifold) as well as during the intake, when the air in the inlet manifold returns to the cylinder. High gas speed would help vaporizing fuel film that is on the inlet valve. There will be spray generated by the interaction, with droplets hitting the walls of the inlet manifold, but that mass will be re-admitted to the cylinder in subsequent cycles (or after the inlet manifold has warmed up).

Since the engine is not sparking during the first cycle and subsequent cycles that are used for warming, it would be possible to operate the engine as a 2-cycle engine. This would require substantial control of the valves, which may be impractical. On the other hand, if the exhaust valve can be de-activated (remains closed), then it would be possible to just adjust the inlet valve timing so that the hot air can be flowed back to the inlet manifold in both the compression cycle and what would have been the exhaust cycle.

Although the above description does not involve sparking during the compression gas heating cycle, it may also be possible to use a spark during the compression gas heating cycle, in order to achieve limited combustion from any fuel that is in the cylinder, such as fuel left over from previous engine operation (and thereby get additional heating from the partial combustion). If the cylinder charge (with uncombusted fuel and with free oxygen) is flushed back to the inlet manifold, then it could pick up additional fuel and mix with some fresh oxygen. As the incompletely combusted mixture is sent back to the inlet manifold, emissions are minimized.

Although the description is for one compression gas heating cycle, to be followed by sparking cycles, it is possible to repeat the non-spark condition for two or more cycles, further improving the likelihood of appropriate combustion during the first fully sparking cycle, and also decrease the emissions during the overall cold-start process. In the case of sparking cycle, adjusting the exhaust valve can be used to reverse the flow of hot gases into the inlet manifold, improving evaporation of the fuel, for a few cycles during the cold start period. The temperatures would be higher (because of combustion in the cylinder), and thus, lower amounts of reverse flow would be required. At this point, the engine is self-driving, and does not need externally supplied power. The exhaust valve timing is adjusted as the engine combusts the air/fuel mixture, as well as the cylinder and the inlet manifold warming up.

Although the calculations described above assume that the flow reversal is readmitted into the same cylinder where it left, it may be possible to use flow reversal from some cylinders into other cylinders of the engine, by appropriate adjustment of the valve timing, inlet manifold pressure and other. It is assumed that in the first cycle, the cylinders are at atmospheric pressure. With reduced pressure in the inlet manifold, it is possible to have a few of the cylinders provide substantial fraction of the air that goes into the cylinders.

The calculations above are for cycles without combustion. Limited number of combustion cycles could also be used with advanced exhaust valve opening and closing. In addition to providing hot gasses to improve evaporation of the fuel by flow reversal in the inlet manifold, early exhaust valve opening allows the rejection of high temperature gasses in the exhaust, assisting in catalyst warming.

A different embodiment is where the exhaust valve is totally de-activated (defined as remaining closed).

For those conditions where the exhaust valve is not deactivated, it is possible to have the inlet valve open during the beginning of the exhaust cycle (with exhaust valve closed), that is, with very retarded exhaust valve opening. Alternatively, it may be possible to achieve compression of the residual air in the exhaust through early closing of the exhaust valve. In this case, the residual air in the cylinder would be compressed, followed by opening of the inlet valve.

The valve lift can be different for the inlet and exhaust valves with the exhaust valve lift being smaller than the inlet valve lift. It may be possible to adjust the exhaust valve lift such that there is substantial compression of the gas, with a substantial fraction of the warmed up gas going to the inlet manifold, through very small lift of the exhaust valve during the exhaust period. The valve lift may also be adjusted, being one set of values during the startup phase and a different set of values during the warm-up phase. Either the inlet valves or the exhaust valves, or both sets of valves, could have variable valve lift.

The engine compression preheat of air can also useful for combined port fuel injection-direct injection systems where port fuel injection is substituted for direct injection in order to reduce particulate emissions. For use of combined port fuel injection and direct injection during cold start, even if the amount of direct injection can be greatly reduced, the particulate emissions from port fuel injection are still considerable. The use of the engine compression heated air for better air/fuel preparation and reduced particulate emissions during port fuel injection can thus have a significant impact on DI engines where port fuel injection is employed to reduce particulate emissions.

In a preferred embodiment, there is no valve overlap during the cold start process. Thus, even when both the inlet valve opening and the exhaust valve closing are advanced, the inlet valve opening should be advanced further than the exhaust valve closing in order to allow hot air to leave through the inlet valve.

The first cycle in each cylinder, in which the air in the cylinder has not combusted (i.e. the non-combustion gas heating cycle), could be used for preheating the air. Multiple cycles without fuel could also be used to condition the air before introducing fuel into the cylinder. The number of non-combustion cycles with different valve timing than in warmed up engine operation can be controlled by open loop control using a look up table or by closed loop control where information from sensors that measure parameters that include engine temperature and various types of emissions.

Once fuel is introduced, combustion gases could be introduced into the inlet manifold, while maintaining advanced exhaust valve opening. The hot gasses could be used for facilitating fuel evaporation. However, a substantial level of residuals would now be present in the cylinder. Nevertheless, better fuel/air preparation and increased charge temperature would mitigate the effect of the increased residuals. Alternatively, after a fuel injection, the engine could be operated through an entire cycle without fuel, in which case the gas flowing back through the inlet valve is mostly air (as fuel was either absent or minimally introduced into the cylinder during the previous cycle).

A drawback of this approach is that the engine will not start during the first cycle for all the cylinders, and it will require some additional power as the engine is serving as an air compressor/heater. However, the emissions would be substantially reduced. Additional battery capability may need to be added for some other applications. The approach is particularly well suited for addressing emissions from hybrid vehicles with substantial electrical power availability during start up. The engine start up does not have to occur at the same time as the time when the vehicle starts moving, as electrical drive could be used at that time.

The system could be useful for reducing both hydrocarbon gas emissions, as well as particulate formation during the cold start. Fuel enrichment, needed in order to attempt appropriate ignition, can be substantially reduced.

Since the reflux air/fuel is substantially warmer than under normal start-up, it may be possible to combine port fuel injection with direct injection in order to achieve appropriate mixture formation. The warmer air could help vaporize the fuel that is directly injected. The direct injection can be used for better control of the air/fuel stoichiometry of the cylinder. This approach, together with the substitution of port fuel injection for direct injection, which can be increased by spark retard, can have a large impact in reduced particulate emissions during cold start from direct injection engines including engines that are turbocharged or supercharged.

Multiple sparking can be used in order to gain increased ignition during the cold start using variable valve timing.

An issue with applying valve timing and lift during cold start is that most automakers utilize hydraulic fluids for these adjustments and the valve timing/lift system is inoperative for a short time during the engine start period (e.g. a few seconds and for at least one second) as the oil pump needs time to build up the oil pressure.

There are several options to address this issue and provide early closing of the exhaust valve. The first one is to use either all-electric valve timing, as with the engine valve VEL and others, or just electric-valve timing assist. Although there are advantages of variable lift, variable timing may be more important and could be sufficient. Variable lift could, in conjunction with variable valve timing, however, be used to control the flow out of the cylinder into the manifolds, minimizing the power required for compressing the gas (that is, to maintain appropriate pressure differential between the cylinder and the inlet manifold). For example, it is of interest to minimize the flow into the exhaust manifold, and instead redirect a substantial fraction of it into the inlet manifold. If the pressure differential is high, choke flow conditions could be established for the reverse flow into the inlet manifold. However, the reverse flow could be choked flow or non-choked flow.

Alternatively, the valve timing could be adjusted so that without oil pressure, the exhaust valve timing is advanced. Once the oil pressure builds, and the engine starts to warm up, the exhaust valve timing is adjusted to the "normal" position. A disadvantage of this approach is that the hydraulics are operating at higher pressures and power requirements than in the case when the valve timing is adjusted so that little effort is needed during warm-up conditions.

Another option is to design a cam that is bi-stable, with two stable operating points that do not require much hydraulic action, but that require hydraulic action for shifting from one stable mode to the other, or to adjust the valve timing during conventional operation.

A further option is to use an electrically driven oil pump. Electrification of the vehicle has resulted in some manufacturers making an electrically driven oil pump. Because the engine does not have to be at operating speed (idle or higher), it is possible to build the oil pressure in a much faster time scale, allowing for hydraulic control of the valve timing during the initial phase of engine startup. Conventional valve timing can be kept, with the valves adjusted hydraulically. The electrically driven oil pump could be used during the startup period time and not at other times in the drive cycle.

The use of variable valve timing/lift can be used for controlling particulate emissions both during the steady state as well as during cold start. In particular, unlike diesel engines where particulate emissions increase with increasing EGR (Exhaust Gas Recirculation), in the case of gasoline direct injection engines, the particulate emissions (both particle number and total mass) is decreased by using EGR, either external EGR (cooled) or hot EGR (internal). Internal EGR can decrease the particulate from gasoline direct injection engines substantially more than external. Thus, the use of variable valve timing, by adjusting valve overlap, can significantly decrease the particulates (both mass and number). The mechanism for the decrease of particulate emissions with internal EGR could be both due to increased rate of fuel evaporation (larger charge in the cylinder as well as higher temperature), and decrease the penetration of the spray. Increased tolerance to EGR by port fuel injection (which can provide higher temperatures in the cylinder by avoidance of evaporation cooling of the fuel) further decreases the particulate emissions from DI engines. That is, increased port-fuel injection, with increased EGR (and preferentially internal EGR), decreases the particulate emissions from dual-injection engines.

In addition to engines that are fueled with gasoline, this approach can be used for engines that are fueled by ethanol or methanol where starting and cold start emissions can be of greater concern than for gasoline engines or even natural gas. One application is for engines using high concentrations of ethanol or methanol, including reduction of formaldehyde gas emissions from methanol. In addition, cold starting in natural gas engines could also benefit from this approach.

The technique could be used in stationary engines as well as on- and off-road vehicles.

The technique may also be used for diesel engine startup. In this case, there is no throttling and there is no fuel on the inlet manifold, but the heated gas should help ignitability of the diesel fuel in subsequent cycles.

The engine compression air preheat can also help in reluctant starting conditions. Although the engine is not started on the first cycle or few cycles because fuel is not introduced, the engine will have a very high probability of starting when fuel is introduced.

The use or non-use of engine compression air preheat can be determined by closed loop control using sensor input or open loop control. The control system can use sensed or inferred information that includes engine temperature and particulate emissions. When engine compression preheat is no longer required, the control system changes the valve timing and lift to values appropriate for regular driving operation.

The use of compression for air heating for emissions reduction could be particularly attractive for downsized engines where the amount of power to turn over the engine is reduced.

In addition to car and truck engines, this approach could be used in other spark ignition engines including but not limited to lawnmower engines, boat engines, snowmobile engines, motor cycle engines, aircraft engines and engines for electric power generation.

It may be possible to use this approach in modification of existing engines in vehicles and the other products mentioned above as well as factory produced engines. If the engine management system has sufficient authority to substantially adjust the exhaust valve, this process could be used in present day vehicles as means to reduce the cold emissions, both hydrocarbons and particulates.

What is claimed is:

1. A fuel management system for a spark ignition engine where fuel is introduced into at least one cylinder by direct injection and where port fuel injection is also used for fueling the at least one cylinder;
  and where the port fuel injection fueling is adjusted so as to reduce particulate emissions by reducing the amount of direct injection that would otherwise occur before a first crank angle which occurs during the intake stroke and after a second crank angle which occurs during the compression stroke;
  and where as torque increases, the fraction of fuel that is directly injected is increased so that it prevents knock.

2. The fuel management system of claim 1 where the fraction of fuel that is provided by direct injection is matched to that needed to prevent knock.

3. The fuel management system of claim 1 where spark retard is used so as to decrease the amount of directly injected fuel that would otherwise be injected before the first crank angle or after the second crank angle.

4. The fuel management system of claim 1 where an increase in direct injector pressure is used to decrease the amount of directly injected fuel that is injected before the first crank angle and after the second crank angle.

5. The fuel management system of claim 1 where engine efficiency is greater than it would be if the engine were fueled by direct injection alone.

6. A fuel management system for a spark ignition engine where fueling occurs by direct injection and by port injection;
  and where particulates generated by direct injection are reduced by use of port fuel injection to reduce the fraction of fuel that would otherwise be provided by direct injection as torque is increased;
  and where the particulates generated by direct injection are also reduced by the use of the port fuel injection so as to keep the amount of the direct injected fuel below a selected level as torque increases.

7. The fuel management system of claim 6 where the start of direct injection timing is such that it occurs after a first crank angle which occurs during the intake stroke and before a second crank angle which occurs during on the compression stroke.

8. The fuel management system of claim 7 where port fuel injection is adjusted so that the time period for direct injection is kept within the time period between the first crank angle and the second crank angle as torque increases.

9. The fuel management system of claim 7 where port fuel injection is adjusted so that the time period for direct injection is kept within the time period between the first crank angle and the second crank angle and where the start of direct injection is such as to maximize mixing.

10. The fuel management system of claim 7 where port fuel injection is adjusted so that the time period for direct injection is kept within the time period between the first crank angle and the second crank angle and where the start of direct injection is such as to provide late injection.

11. The fuel management system of claim 6 where the start of direct injection is adjusted so as to minimize the direct injection generated particulate reduction.

12. The fuel management system of claim 6 where, as BMEP increases, the fraction of fuel provided by direct injection is matched to that needed to prevent knock.

13. The fuel management system of claim 6 where engine efficiency is greater than it would be if the engine were fueled with direct injection alone.

14. A fuel management system for spark ignition engine which has both a port fuel injection system and a direct fuel injection system;
  and where there is a first cold start period wherein the average fraction of fuel provided by direct injection is less than the average amount of fuel provided by direct injection during the rest of the engine operation period;
  and wherein during at least part of the first cold start period, the fraction of fuel that is provided by direct injection is matched to that needed to prevent knock as engine torque and speed vary;
  and where spark retard is used to reduce or eliminate the fraction of fuel that would otherwise be provided by direct injection;
  and where spark retard reduces direct injection generated particulate emissions by decreasing the fraction of fuel that is provided by direct injection;
  and where the first cold start period is longer than a second cold start period which is a cold start period for catalyst warmup.

15. The fuel management system of claim 14 where only port fuel injection alone is used during the first cold start period and the absence of direct injection is enabled by spark retard.

16. The fuel management system of claim 14 where spark retard reduces direct injection generated particulate emissions by reducing the time period for direct injection.

17. The fuel management system of claim 14 where variable valve timing is used to enable operation with no use of direct injection.

18. The fuel management system of claim 14 where the first cold start period is 100 seconds.

19. The fuel management system of claim 14 where open-valve port fuel injection is used.

20. The fuel management system of claim 14 where spark retard is increased to provide the largest decrease in the fraction of fuel that is provided by direct injection, including elimination of direct injection, without the occurrence of misfire.

21. The fuel management system of claim 14 where the first cold start period is determined by a look up table.

22. The fuel management system of claim 14 where the first cold start period is determined by engine temperature.

23. A fuel management system for a spark ignition engine where the spark ignition engine is fueled by direct injection and port fuel injection and where the start of the direct injection and/or the duration of the direct injection are adjusted so as to reduce the amount of direct injected fuel that is introduced into the engine before a first crank angle during the intake stroke and after a second crank angle during the compression stroke;

where the engine is fueled with gasoline, and where the use of port fuel injection decreases the time that direct injection occurs before the first crank angle and after the second crank angle.

24. The fuel management system of claim 23 where as engine speed increases the value of brake mean pressure above which there is a large increase in direct injection generated particulate emissions decreases.

25. The fuel management system of claim 23 where the amount of direct injection that occurs before the first crank angle and after the second crank angle decreases with increasing direct injection pressure.

26. The fuel management system of claim 23 where the fraction of fuel that is provided by direct injection is matched to the fraction needed to prevent knock as torque is increased.

27. The fuel management system of claim 23 where spark retard is used to decrease the amount of directly injected fuel that is introduced into the engine before the first crank angle and after the second crank angle.

* * * * *